(12) United States Patent
Gibbons

(10) Patent No.: US 11,609,094 B1
(45) Date of Patent: Mar. 21, 2023

(54) 5.5K COARSE AZIMUTH POINTING SYSTEM FOR BALLOON GONDOLAS

(71) Applicant: United States of America as represented by the Administrator of NASA, Washington, DC (US)

(72) Inventor: Caitlin Gibbons, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 845 days.

(21) Appl. No.: 16/547,916

(22) Filed: Aug. 22, 2019

(51) Int. Cl.
*H02K 5/16* (2006.01)
*G01C 21/18* (2006.01)
*G05D 1/00* (2006.01)
*B64B 1/22* (2006.01)
*H02K 7/14* (2006.01)
*B64B 1/40* (2006.01)
*H02K 7/08* (2006.01)

(52) U.S. Cl.
CPC .............. *G01C 21/18* (2013.01); *B64B 1/22* (2013.01); *B64B 1/40* (2013.01); *G05D 1/0094* (2013.01); *H02K 5/16* (2013.01); *H02K 7/086* (2013.01); *H02K 7/14* (2013.01)

(58) Field of Classification Search
CPC .. H02K 5/00; H02K 5/16; H02K 7/00; H02K 7/08; H02K 7/086
See application file for complete search history.

(56) References Cited

U.S. PATENT DOCUMENTS 4,043,621 A * 8/1977 Heinz .................. H01R 39/14
384/510

FOREIGN PATENT DOCUMENTS

IT             1224935          * 10/1990

* cited by examiner

*Primary Examiner* — Tran N Nguyen
(74) *Attorney, Agent, or Firm* — Matthew F. Johnston; Trenton J. Roche

(57) ABSTRACT

The present invention relates to a novel rotator for a standardized coarse azimuth-pointing system for a balloon-borne platform—either zero pressure or Super Pressure Balloons (SPB)—with a maximum suspended payload of 5,500 lbs. The 5.5K Rotator novel shaft design, bearings, motor, and housing, result in a weight of the rotator being decreased by 33% from existing legacy rotators. The present invention achieved a 24% parts reduction from existing legacy rotators, and has the advantages of lighter weight, reusability, cost-effectiveness, machinability, and ease of assembly.

1 Claim, 1 Drawing Sheet

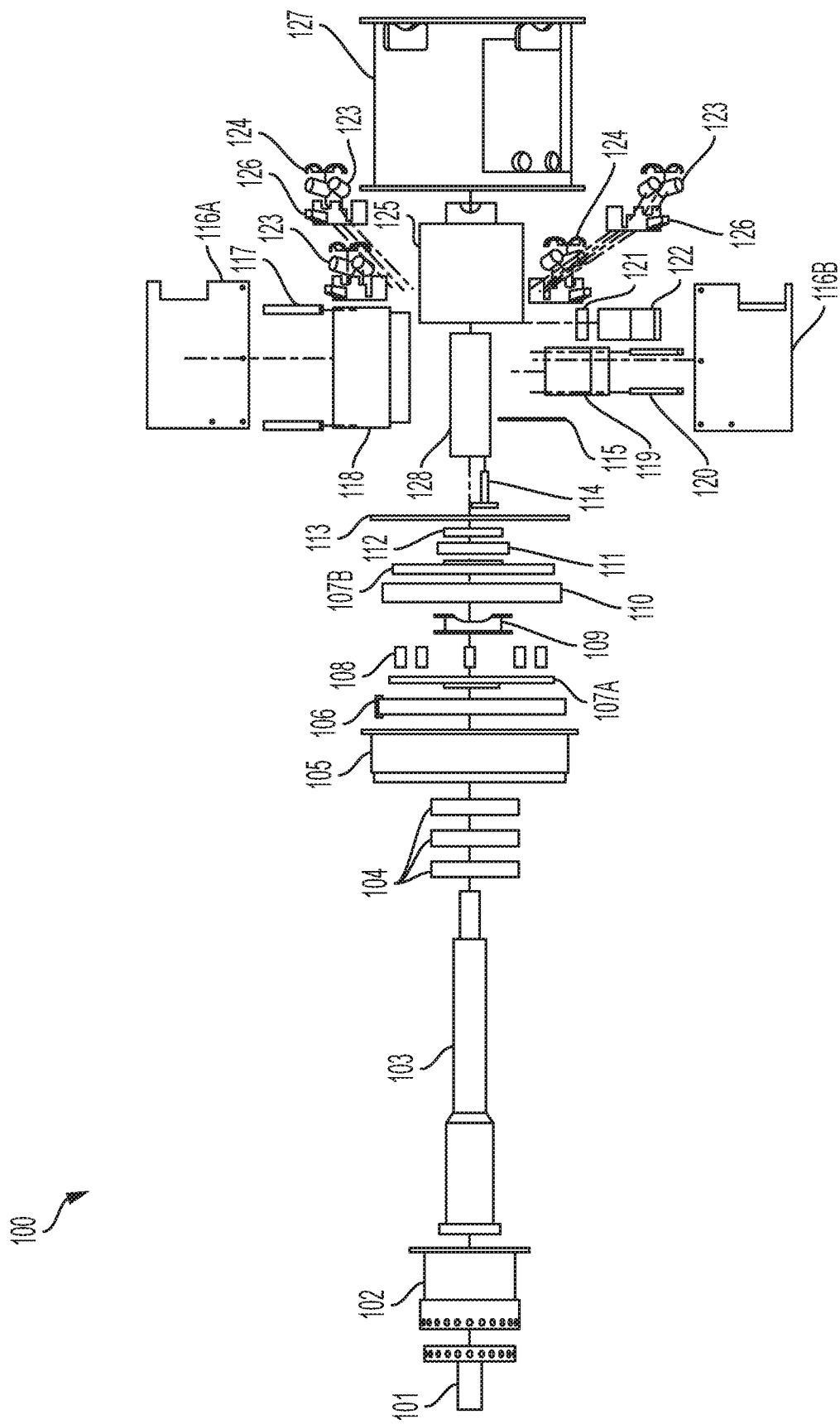

5.5K COARSE AZIMUTH POINTING SYSTEM FOR BALLOON GONDOLAS

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to a 5.5K Rotator, which operates as a completely functional and operating coarse azimuth pointing system used on all types of balloon missions.

2. Description of the Related Art

An existing (legacy) rotator, known as a Long Duration Balloon (LDB) rotator—formally known as the Solar Pointing System (SPS)—is a standardized balloon flight subsystem that is mounted right above the payload, and it separates the rotation of the gondola from the balloon. The legacy rotator is about 124 lbs. and it was designed to support a maximum payload of 8,000 lbs. and withstand a 10G axial termination load factor. A majority of balloon payloads are no greater than 5,500 lbs., thus, the legacy rotator is overdesigned for most balloon missions. Reduction of mass of the rotator is important because depending on the balloon launch vehicle, it allows for more instrumentation to be added to the payload or for a longer flight duration. This allows for more science data to be collected per balloon flight.

Thus, the objective of the present invention, was to design a coarse-azimuth pointing system that was at least 25% lighter than the legacy rotator, and that was capable of carrying a 5,500 lbs. maximum suspended payload that would withstand the 10G axial termination load factor. Thus, the needed improvements for the rotator included reduced weight, re-usability, cost-effectiveness, machinability, and ease of assembly.

SUMMARY OF THE INVENTION

The present invention relates to a 5.5K Rotator that is designed to be a standardized coarse-pointing system for any balloon-borne platform with a suspended payload that is 5,500 lbs. or less. The 5.5K Rotator is a novel design over the legacy rotator, which resulted in the important feature of reducing the mass of the system by 33%. The 5.5K Rotator is 83 lbs. with a slip ring, and 73 lbs. if chosen to fly without the slip ring. The 5.5K Rotator design is flight qualified for Zero Pressure and Super Pressure Balloon (SPB) missions.

In one embodiment, a rotator for a coarse azimuth-pointing system for a balloon-borne platform with a maximum suspended payload of 5,500 lbs., includes: a shaft inserted through a motor and a slip ring; wherein the shaft is hollow and made of titanium alloy; a motor housing which includes a rotor and a stator; and a pair of motor plates which fasten together with a plurality of motor plate standoffs which are fastened directly to a motor frame that is slip fit to the shaft inside the motor housing.

In one embodiment, the rotator further includes: a slip ring; a slip ring sleeve disposed in the slip ring and which accommodates the shaft; a plurality of slip ring housing doors which cover the slip ring; and a slip ring housing which covers the slip ring housing doors; wherein the slip ring sleeve and slip ring are fastened to the shaft; and wherein the slip ring is also held in place to the shaft with a slip ring locking stud and a slip ring locking bar.

In one embodiment, the rotator further includes: a plurality of axial bearings disposed on the shaft on one side of the motor housing; and a motor housing cover which is disposed on the shaft on another side of the motor housing.

In one embodiment, the rotator further includes: a radial bearing disposed in a radial bearing housing and accommodated on the shaft, the radial bearing housing being disposed within the motor housing.

In one embodiment, the pair of motor plates, the motor frame, and the plurality of motor plate standoffs are lowered onto the shaft and are disposed within the motor housing.

In one embodiment, the rotator further includes: a plurality of solar sensors accommodated in a plurality of solar sensor brackets, the plurality of solar sensors being disposed directly to the slip ring housing and which receive light through cutouts in the slip ring housing; a controller module for avionics having a plurality of controller module brackets, the controller module which is disposed in one of a pair of slip ring housing doors disposed in the slip ring housing; a motor controller having a plurality of motor controller brackets, the motor controller which is disposed in another of the pair of slip ring housing doors disposed in the slip ring housing; and a rate sensor module having a plurality of rate sensor module brackets, the rate sensor module being disposed with the motor controller in another of the pair of slip ring housing doors disposed in the slip ring housing.

In one embodiment, the plurality of solar sensor brackets, the plurality of controller module brackets, the plurality of motor controller brackets, and the plurality of rate sensor module brackets, are all disposed directly to a curvature of the slip ring housing.

In one embodiment, the plurality of solar sensor brackets, the plurality of controller module brackets, the plurality of motor controller brackets, and the plurality of rate sensor module brackets, are 3D-printed from a plastic.

In one embodiment, the rotator further includes: a lug, an axial bearing housing, and a radial bearing housing, which accommodate the shaft at one end thereof; wherein said lug, said axial bearing housing, and said radial bearing housing, are formed of titanium alloy.

In one embodiment, the lug, the axial bearing housing, and the shaft can withstand a 15G load factor; and wherein a hole in the lug and at an end of the shaft meets axial loading of e|D>1.5, where e is edge distance and D is hole diameter.

In one embodiment, the plurality of solar sensors provides a 360-degree view.

In one embodiment, an avionics package of the rotator has a 5 arc-minute pointing capability.

In one embodiment, the rotator has a thermal range of −80 degrees C. to 50 degrees C.

In one embodiment, the rotator further includes: a powder coating which is disposed on external surfaces of the rotator formed of the titanium alloy and of external surfaces of the rotator formed of aluminum, the external surfaces of titanium or aluminum including at least the slip ring housing, the motor housing, the axial bearing housing, and the lug, the powder coating which provides thermal and corrosion resistance protection to the rotator.

Thus, has been outlined, some features consistent with the present invention in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

The FIG. is a schematic diagram of an exploded view of the 5.5K Rotator for a coarse-pointing system for a balloon-borne platform, according to one embodiment consistent with the present invention.

DESCRIPTION OF THE INVENTION

The present invention relates to a 5.5K Rotator which operates to be a completely functional and operating, standardized, coarse azimuth-pointing system used on balloon-borne platforms with a suspended payload of less than 5,500 lbs. The rotator integrates with the balloon platform that flies in the stratosphere, at altitudes between 110,000 and 130,000 feet, which is above approximately 99.5% of Earth's atmosphere. The balloon systems are used in missions that include, but are not limited to, astrophysics and planetary science projects.

The rotator of the present invention is used specifically for balloons, both zero pressure and Supper Pressure Balloons (SPB), with a maximum suspended payload of 5,500 lbs. Super pressure balloons have a maximum payload capacity lower than that for zero pressure balloons, thus weight savings are especially critical for SPB missions. The rotator is mounted above the payload and separates the rotation of the gondola from the balloon. The rotator functions as a coarse-azimuth pointing system for the payload. The 5.5K Rotator utilizes the same NASA designed avionics package—Improved Rotator Azimuth Control Electronics (IRACE)—that the legacy rotator utilizes. TRACE was designed so that the rotator would have a pointing capability of 5-arcminutes, though the 5.5K Rotator has demonstrated 1.4 arcminute capability with the IRACE packages.

In one embodiment, the rotator 100 of the present invention (see FIGURE) includes a shaft 103 inserted through the major components of a plurality of axial bearings 104 (three axial (3) bearings as shown), a motor housing 105, a stator 106, a motor plate 107A, a plurality of motor plate standoffs 108 (eight (8) standoffs), a motor frame 109, a rotor 110, a motor plate 107B, a radial bearing housing 111, a radial bearing 112, a motor housing cover 113, a slip ring sleeve 128, a slip ring 125, and a slip ring housing 127.

In one embodiment, the motor (the stator 106 and rotor 110) of the present invention is a Kollmorgen Direct Drive Brushtype Frameless Motor. In one embodiment, the motor runs on a 28V battery source (not shown). In one embodiment, the motor power draw has a daytime average which does not exceed 3.5 W.

In one embodiment, a motor plate 107A, a plurality of motor plate standoffs 108 (eight (8) standoffs as shown in the FIGURE), and a motor frame 109, are disposed between the stator 106 and the rotor 110. In one embodiment, a motor plate 107B, a radial bearing housing 111, a radial bearing 112, and a motor housing cover 113 are disposed between the rotor 110 and the slip ring housing 127.

In one embodiment, the overall motor frame for the 5.5K rotator 100 of the present invention is simplified, stiffened, and strengthened compared to the legacy rotator. In the present invention, the complicated and compliance-heavy, legacy, rotator motor frame was replaced with novel motor plates 107A, 107B which fasten together with motor plate standoffs 108, which are then fastened (using suitable mechanisms such as bolts) directly to the inner motor frame 109 standoff piece that was slip fit to the shaft 103. This inner motor frame 109 piece is fastened directly into the shaft 103 (with two bolts, not shown). Thus, the 5.5K motor frame of the present invention is lighter, cheaper to machine, and easier to assemble than the legacy motor frame. In one embodiment, the ease of assembly includes handles on the motor plate 107B (not shown) and the use of socket head cap screws, wherever possible.

In one embodiment, in the rotator 100 of the present invention, the slip ring housing 127 includes a slip ring 125, two (2) slip ring housing doors 116A, 116B, and a slip ring sleeve 128 disposed in the slip ring 125. In one embodiment, the slip ring 125 is slip fit over the slip ring sleeve 128, all of which are rigidly fastened (i.e., bolted—not shown) to the shaft 103. The slip ring 125 is held secondly by a slip ring locking stud 114 and a slip ring locking bar 115.

In one embodiment, eight (8) LI-COR pyranometers that are solar sensors 123, are disposed in brackets—four (4) solar sensor top brackets 124, and four (4) solar sensor bottom brackets 126 (see FIGURE)—that mount to the inside of the slip ring housing 127 so that the LI-CORs are protected under the slip ring housing 127 upper flange, and are looking out to the sun. In one embodiment, an avionics controller module 118 with brackets 117, is covered by slip ring housing door 116A. In one embodiment, a motor controller 119 with brackets 120, and a rate sensor module 122 with rate sensor brackets 121, are covered by slip ring housing door 116B.

In one embodiment, the design of the 5.5K rotator 100 accommodates the option of integrating a slip ring with 20 separate channels for power, digital subscriber line (DSL) link, and Acquisition Requirements Roadmap Tool (AART) communications. The present invention uses a custom 2424-00-20 Electro-Miniatures slip ring; which weighs about 10.6 lbs.

In one embodiment, the brackets 117, 120, 121, for the avionics packages—the controller module 118, the rate sensor 122, and the motor driver 119—are stabilized and standardized by making the design mounts directly to the curvature of the housing 127, by 3D printing the brackets 117, 120, 121 in ABS plastic, for example. The novel brackets for the 5.5K Rotator greatly reduced noise and eliminated the extra jitter that was observed in the rate sensor when using the mounting brackets of the legacy rotator.

In addition, in one embodiment, the solar sensor brackets 124, 126 were also 3D printed (in ABS plastic, for example) to reduce weight and the amount of parts necessary to assembly to the rotator 100. Further, the 3D printing of the brackets 124, 126— eight (8) pieces total, as shown in the FIGURE, at 0.44 lbm total achieved an 87% mass reduction over machined mounts of existing legacy rotators (which have 21 pieces and weigh 3.49 lbm total).

In one embodiment, 3D printed drill jig templates (not shown) were designed and demonstrated ability to standardize the assembly of the rotator 100, and solved prior problems of nonuniform match drilling of the legacy rotator.

In one embodiment, the load path hardware of the rotator 100 was chosen to be more lightweight than existing steel rotators, and to achieve the advantages of high strength, cost-efficiency, durability, and functionality at low temperatures. In one embodiment, a titanium (Ti) alloy was chosen for having adequate strength while being lighter than steel. In one embodiment, Ti-6Al-4V was selected for the load path hardware—i.e., shaft 103, bottom lug 101, bearing housing 102, and radial bearing housing 111—for the 5.5K rotator 100 of the present invention. Other components are made of Aluminum 6061-T6.

In one embodiment, the shaft 103 was hollowed out to reduce its weight while maintaining stiffness in the structure. Thus, in one embodiment, Ti-6Al-4V was used for the shaft 103, resulting in a weight of only about 13.8 lbs., which is 53% lighter than existing legacy rotator shafts. With the titanium alloy material used in the shaft 103 of the present invention, the 15G load requirement—which is the 10G axial termination load factor times 1.5 Factor of Safety— was satisfied. The resulting shaft 103 of the present invention is stronger, easier to machine, and easier to assemble the rotator 100 than existing legacy rotator devices.

In one embodiment, the bottom lug 101 of the present invention was designed to make it lighter, resistant to corrosion, and easier to assemble the rotator 100. The bottom lug 101 was designed to endure a 15G load factor, and the inventor found that a Ti-6Al-4V material would endure that load, resulting in a weight of just 5.7 lbs. (a 43% reduction from existing legacy rotator steel bottom lugs weighing 10 lbs). The bolt pattern that connected the bottom lug 101 to the bearing housing 102 was made more uniform, for ease of assembly.

In one embodiment, the (bolt) hole in the lug end 101 of the shaft 103 of the present rotator 100 was designed to ensure that eID>1.5 to be conservative in a shear or tear-out case. The radius around the collar of the shaft 103 changed from 0.063" to a 0.125" undercut radius. The undercut is important for the angular contact bearings to seat flat against the shoulder of the shaft 103. The undercut radius bears the load and dissipates the stress around that corner.

In one embodiment, the axial bearing housing 102 and the radial bearing housing 111 of the present invention were made from titanium alloy to be lighter, stronger, and resistant to galvanic corrosion. Just like the bottom lug 101, the bearing housing 102 was designed to be made from a titanium alloy (i.e., Ti-6Al-4V) instead of steel (like that of the legacy rotator lug and bearing housings), which resulted in a reduction of about 1.5 lbs.

In one embodiment, other important design features include an undercut radius on the collar of the angular bearing housing 102. The inner collar was thickened, and radii were added to the outside of the housing 102 to increase strength. The undercut radius on the inner collar is an important feature because it bears the load and dissipates the stress around that corner. Additionally, it ensures that angular contact bearings sit flat on the collar.

In one embodiment, using the above design, the rotator 100 of the present invention accomplished a reduction in weight of 33% over existing rotators. Reducing the weight is important because it provides scientists or flight operations with the option to either include more instruments on the payload or hold a longer-duration mission, depending on if the launch vehicle is a SPB or a zero-pressure balloon. In one embodiment, the present invention includes a rotator 100 weighing 83 lbs. with slip ring 125, and 73 lbs. without slip ring 125.

In use, in one embodiment, the present invention can utilize either GPS—through the RACE avionics packages— or solar sensors 123 for command orientation of the payload, thus having redundant pointing capability systems. In one embodiment, the LI-COR mounts 124, 126 included mounting specifications where the sensor 123 is at a 15-degree angle upwards, each sensor 123 is angled at 45 degrees apart, and the universal joint (not shown) is situated 45 degrees between two pairs. In one embodiment, the eight (8) LI-COR solar sensors 123 are disposed at the top of the rotator 100 providing a 360-degree view. In one embodiment, Guidance Navigation and Control (GNC) commands a pair of sensors 123 to look at a specific point, i.e., the sun. In one embodiment, that command is sent through the avionics packages—the controller module 118, the rate sensor 122, and the motor driver 119—on board to start the motor 110 and turn the shaft 103 until the sensors 123 send feedback that they are at the commanded position. Then the rotator 100 holds the payload at that position until commanded otherwise.

In one embodiment, the 5.5K Rotator satisfies the 15G axial load factor—which incorporates the Balloon Program office requirements of 10G axial termination load factor and 1.4 Factor of Safety (FS) if non-brittle, 1.5 FS if brittle (materials less than 10% elongation at −60 C degrees, upon consideration). In one embodiment, the 5.5K rotator 100 designed to a thermal range of −80 degrees C. to 50 degrees C. (−112 to 122 degrees F.), but was only tested to a thermal range of −60 degrees C. to 24 degrees C.

In one embodiment, a powder coating specification was added to all of the external surfaces of the rotator hardware, both titanium and aluminum parts (parts not made of titanium are mostly aluminum), for thermal protection. In one embodiment, titanium is used as it is corrosion resistant and compatible with aluminum; the powder coating offers an extra layer of protection from corrosion for both metals.

Accordingly, in summary, the present invention is a novel rotator for a standardized coarse azimuth-pointing system for a balloon-borne platform—either zero pressure or Super Pressure Balloons (SPB)— with a maximum suspended payload of 5,500 lbs. The 5.5K Rotator utilizes the TRACE avionics packages that were designed to have pointing capability of 5-arcminutes; though the 5.5K Rotator has demonstrated 1.4 arcminute capability with the TRACE packages.

In one embodiment, with the novel shaft design, bearings, motor, and housing, the weight of the rotator is decreased by 33% from existing legacy rotators which weigh about 124 lbs. without any fasteners. In one embodiment, the rotator of the present invention weighs about 83 lbs. without fasteners. The present invention achieved a 24% parts reduction from existing legacy rotators. Finally, the present invention has the advantages of lighter weight, reusability, cost-effectiveness, machinability, and ease of assembly.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A rotator for a coarse azimuth-pointing system for a balloon-borne platform with a maximum suspended payload of 5,500 lbs., comprising:

a shaft inserted through a motor and a slip ring;

wherein said shaft is hollow and comprised of titanium alloy;

a motor housing which includes a rotor and a stator; and a pair of motor plates which fasten together with a plurality of motor plate standoffs which are fastened directly to a motor frame that is slip fit to said shaft inside said motor housing a slip ring sleeve being disposed in said slip ring;

a plurality of slip ring housing doors covering said slip ring; and a slip ring housing covering said slip ring housing doors;

wherein said slip ring sleeve and slip ring are fastened to said shaft; and wherein said slip ring is also held in place to said shaft with a slip ring locking stud and a slip ring locking bar.

* * * * *